United States Patent [19]
Galik

[11] Patent Number: 5,466,375
[45] Date of Patent: Nov. 14, 1995

[54] LIQUID-LIQUID EXTRACTION

[76] Inventor: George M. Galik, 3236 Falcon Ridge Rd., Diamond Bar, Calif. 91765

[21] Appl. No.: 95,302

[22] Filed: Jul. 21, 1993

[51] Int. Cl.$^6$ ................................................ B01D 11/02
[52] U.S. Cl. ..................................... 210/634; 210/651
[58] Field of Search ................................ 210/638, 651, 210/195.2, 644, 649, 259, 640, 634, 650, 511; 423/24; 204/106, 107, 108

[56] References Cited

U.S. PATENT DOCUMENTS

| | | | |
|---|---|---|---|
| 3,989,467 | 11/1976 | Paige | 23/267 |
| 4,083,758 | 5/1978 | Hamby et al. | 204/106 |
| 4,221,658 | 9/1980 | Hardwick | 210/634 |
| 4,595,571 | 6/1986 | Galik | 422/259 |
| 4,657,401 | 4/1987 | Galik | 366/263 |
| 4,689,152 | 8/1987 | Liang | 210/649 |
| 4,778,688 | 10/1988 | Matson | 210/321.89 X |
| 5,004,000 | 4/1991 | Berruex | 134/108 |
| 5,234,597 | 8/1993 | Welmers et al. | 210/640 |

OTHER PUBLICATIONS

"Desal Technical Bulletin RO Fundamentals", Desalination Systems, Inc., Oct. 1986, 21 pages.
"Desal Product Specifications Desal–3LP", Desalination Systems, Inc., May 1990, 1 page.
"Desal Engineering Section Index", Desalination Systems, Inc., Jun. 1990, 51 pages.
"Process Selection Guide", Desalination Systems, Inc., Jun. 1990, 1 page.
"Desal Product Summary Ultraviltration and Microfiltration Elements", Desalination Systems, Inc., Jun. 1990, 1 page.
"Desal Product Announcement" (Desal 5 Membrane), Desalination Systems, Inc., no date available, 2 pages.
"Desal Product Summary Reverse Osmosis Elements", Desalination Systems, Inc., Jun. 1990, 1 page.

*Primary Examiner*—Frank Spear
*Attorney, Agent, or Firm*—Christie, Parker & Hale

[57] ABSTRACT

Liquid-liquid extraction apparatus includes an extractor unit where a first liquid contacts a second liquid so a component is transferred from the first liquid to the second liquid. The extractor unit has an inlet for the first liquid with the component in it, and an outlet for the first liquid from which the component has been removed. The extractor unit also includes an inlet for a second liquid to which component is transferred from the first, and an outlet for second liquid to which component has been transferred from the first liquid in the extractor unit. A separator having an inlet and a permeate outlet includes a semi-permeable membrane which forms a barrier between the separator inlet and the permeate outlet. The separator inlet is connected to one of the outlets of the extractor unit, and the semi-permeable membrane is permeable to most of the liquid flowing from that outlet. The membrane is substantially impermeable to any other entrained liquid, so only one liquid flows through the membrane and out the permeate outlet substantially free of any other liquid. A reject outlet opening into the separator on the same side of the membrane as the inlet permits removal from the separator liquid not passed by the membrane.

8 Claims, 5 Drawing Sheets

LIQUID-LIQUID EXTRACTION

FIELD OF THE INVENTION

This invention relates to improved throughput and the reduction or elimination of cross-contamination in liquid-liquid extraction.

BACKGROUND OF THE INVENTION

Liquid-liquid extraction has long been used to transfer one or more components in a first liquid to a second liquid which is substantially immiscible with the first liquid. Typically, the liquid to be treated is contacted with a suitable substantially immiscible second liquid having a different specific gravity from the first, and which preferentially extracts one or more components from the first liquid. After the extraction step, the two liquids are allowed to separate by gravity. The component extracted by liquid-liquid extraction may be liquid, solid, or in ionic form.

In one example of liquid-liquid extraction, a component carried in inorganic solvent (such as water) is removed (extracted) from an aqueous phase by contacting the aqueous phase with an organic liquid (such as kerosene) phase, followed by phase separation. Similarly, acidic or basic components of an organic solution are removed by contacting the organic solution with an alkaline or acidic aqueous solution, as appropriate.

In another use of liquid-liquid extraction, an aqueous solution containing an ionic species, say, copper ions, is contacted with a liquid "ion exchange material", which forms all or part of an organic liquid immiscible with the aqueous solution. When the two liquids contact each other, the ionic species leaves the aqueous phase to combine with the ion exchange material (ion exchanger) in the organic phase to form a compound soluble in the organic phase, but insoluble in the aqueous phase. An example of a liquid ion exchanger soluble in a liquid hydrocarbon vehicle, such as kerosene, is a hydroxy oxime ion exchanger, which is used to extract copper from acidic or basic aqueous solutions containing copper ions. A typical hydroxy oxime ion exchanger is sold under the trademark "LIX 84N" by Henkel Corporation, Tucson, Ariz.

In a typical liquid-liquid extraction process, the two immiscible liquids of different specific gravities are brought into contact to cause the mass transfer of one or more components from one liquid to the other. Thereafter, the two liquids are permitted to separate by gravity. The mixing and subsequent separation is called an extraction stage. In each such stage, one liquid is dispersed in the other, and the resulting dispersion is allowed to settle out to separate the two liquids. The equipment used for each extraction stage is usually called a mixer-settler, or an extractor.

Many liquid-liquid extraction operations use a plurality of mixer-settler units connected in series to provide for countercurrent flow as the aqueous phase moves through the mixer-settlers in one direction, while the organic phase moves in the opposite direction. For example, a liquid-liquid extraction plant can include one or more mixer-settler units that make up an "extraction section" in which a component is transferred from one liquid (the feed) into a second liquid (the extractant), as described above. The plant also usually includes one or more mixer-settler units in series with the extraction section to provide a "stripping section", where each mixer-settler acts as a "stripper" to remove extracted component from the extractant. In the mixer-settler units of the stripping section, the organic liquid extractant, i.e., the second liquid loaded with the component transferred from the first liquid, contacts an immiscible stripper liquid which removes or strips the transferred component from the extractant to the stripper liquid. This regenerates the extractant, which is recovered from the stripping section and recycled back to the extraction section for removing more component from additional first liquid carrying the component.

That part of the first liquid from which component has been removed (the "raffinate") can either be discarded or reused. For example, U.S. Pat. No. 4,083,758 (1978) to Hamby et al discloses process and apparatus for recovering metallic copper from chloride-containing spent etching solutions, and for regenerating the etching solution for reuse. In the Hamby et al patent, spent chloride-containing ammoniacal aqueous etching solution from making printed circuit boards is treated with an ion exchanger in an organic liquid to remove copper ions so the spent etching solution can be regenerated and reused to dissolve additional copper from printed circuit boards. The copper removed by the liquid ion exchanger is stripped from the exchanger liquid with a sulfuric acid stripper solution, which regenerates the ion exchanger so it can be reused. Copper is removed from the stripper solution by electrowinning so the sulfuric acid can be recycled for recovering additional copper.

According to the Hamby et al patent, the organic ion exchanger also removes chloride ions with the copper ions. The chloride ions present a hazard during the electrowinning of the copper because chlorine gas is released. Therefore, the chloride ions are removed by washing the pregnant organic liquid with a weak aqueous acidic solution. This washing step creates a waste solution containing chloride ions, which presents a waste disposal problem.

The carryover of unwanted chloride ions with the copper ions, as disclosed in the Hamby et al patent, is an example of "cross-contamination", which limits the use of liquid-liquid extraction, especially as waste disposal requirements become increasingly stringent and expensive.

Cross-contamination and slow phase separation by the action of gravity imposes a severe restraint on liquid-liquid extraction. The rate of transfer of a component from one liquid to another depends on the effective surface area of contact between the two liquids. Ideally, for a maximum transfer rate of component from one liquid to another, the two liquids should be thoroughly homogenized, i.e., agitated into a suspension of tiny droplets of one liquid in the other as a continuous phase. This would result in a high rate of mass transfer of a component from one liquid to the other, but the liquids would be difficult to separate by gravity, and would require large retention time and settling tanks to avoid unacceptable cross-contamination. Consequently, the two liquids are normally agitated together in a relatively gentle fashion to avoid over-dispersion or emulsification of one liquid into the other so that separation can be obtained by gravity settling within a reasonable amount of time and space. Even then, a small amount of each liquid is entrained in the other, resulting in cross-contamination which adversely affects product quality, throughput, and operating costs.

A variety of mixer-settler units have been designed to improve liquid-liquid contact and to minimize cross-contamination in liquid-liquid ion exchange processes. For example, U.S. Pat. No. 3,989,467 to Paige discloses equipment which includes a mixing tank where two liquids are gently mixed to form a dispersion which then flows into a shallow settling tank with a large horizontal cross-sectional area located adjacent the mixing tank. As the dispersion flows horizontally across the settling tank, three layers form. The upper and lower layers are formed by the coalesced phases as the two liquids separate from the dispersion. The middle layer, which is usually only a few inches deep, is a dispersion of one of the liquids in the other. The separated phases are removed from the end of the settling tank remote from the mixing tank by suitably located weirs which retain the dispersion layer in the tank. The large horizontal area of conventional gravity settlers, such as the unit just described, requires an undesirably large inventory of organic liquids in the settler. In addition, such horizontal units take up an inordinate amount of floor space. Attempts to reduce the cross-sectional area of such settling tanks for a given flow rate results in a disproportionate increase in the depth of the dispersion layer and, accordingly, can result in flooding of the settler with dispersion. This results in carryover of one of the liquids in the other (cross-contamination) and causes inefficiencies in operation.

U.S. Pat. No. 4,221,658 to Hardwick (1980) addresses the problem of undesirably large organic inventories in settling tanks of large horizontal cross-sectional area by providing a generally vertical mixer-settler unit where mixing and settling are carried out in the same vessel. My U.S. Pat. Nos. 4,595,571 (1986) and 4,657,401 (1987) disclose an improved liquid-liquid extractor which minimizes required floor space and reduces the problem of carryover or cross-contamination arising from small amounts of one liquid phase being entrained in the other liquid. As indicated above in the discussion of the Hamby et al patent, cross-contamination can be reduced by using special wash stages to remove contaminating materials. However, the additional wash stages are not always entirely effective. Moreover, the effluent from such wash columns presents an environmental problem of disposing of the effluent from the wash columns.

SUMMARY OF THE INVENTION

This invention provides liquid-liquid extraction apparatus and method which improves throughput by faster separation of the two immiscible liquids, and which reduce cross-contamination to acceptable levels without using wash columns, which cause waste disposal problems.

The apparatus and process of this invention increase the throughput of liquid-liquid extraction operations, such as that disclosed in my U.S. Pat. No. 4,595,571, by more than 50%, and virtually eliminate cross-contamination problems.

In terms of liquid-liquid extraction apparatus for transferring a component in a first liquid to a second liquid which is substantially immiscible in the first liquid, the apparatus includes an extractor unit where one liquid contacts the other so the component is transferred from the first to the second liquid. The extractor has an inlet for the first liquid with the component in it, and an outlet for the first liquid from which the component has been removed. The extractor also includes an inlet for a second liquid (extractant) to which the component is transferred from the first liquid in the extractor, and an outlet for the second liquid to which the component has been transferred from the first liquid in the extractor.

A stripper unit for removing component from the second liquid includes an inlet and an outlet for the second liquid, and an inlet and an outlet for a stripper liquid which contacts the second liquid in the stripper and removes component from the second liquid. Means are provided for moving second liquid with the component in it from the extractor outlet for the second liquid to the stripper inlet for the second liquid. A source of stripper liquid is connected to the stripper inlet for stripper fluid.

A separator having an inlet and a permeate outlet includes a semi-permeable membrane disposed in the separator to form a barrier between the separator inlet and the permeate outlet. The membrane is permeable to one of the liquids and substantially impermeable to the other. The separator inlet is connected to an outlet of one of the units so that one liquid from that outlet flows through the semi-permeable membrane to the permeate outlet substantially free of other liquid. This rapidly separates entrained liquid from that passing through the membrane to avoid cross-contamination and therefore permits more vigorous stirring of the two liquids together to speed the transfer of component from one liquid to the other. The separator, which can be relatively small, provides the function of a large-area settler without the attendant space or cost. Accordingly, with this invention, the liquids can be stirred together more vigorously (and intimately), and flow through the extractor faster than was previously possible with prior art equipment.

A reject outlet opens into the separator on the same side of the membrane as the inlet for removing from the separator liquid not passed by the membrane.

In one form of the invention, the separator inlet is connected to the extractor outlet for the second liquid so the semi-permeable membrane prevents carryover of first liquid which may be entrained with the second liquid, and which may contain contaminant, such as ammonium chloride, if copper is being recovered from an aqueous ammoniacal solution of ammonium chloride.

In a preferred form of the invention, each extractor unit and each stripper unit includes a respective pair of separators. The inlet of one of the separator pairs is connected to one outlet of the unit, and the inlet of the other separator is connected to the other outlet of the unit. The separators are substantially identical to the one described above, except that the semi-permeable membrane in one of the pairs is permeable to the one type of liquid, say, water, and substantially impermeable to the other type of liquid, say, organic liquid. The semi-permeable membrane in the other of the pair of separators is permeable to the organic liquid, and substantially impermeable to water. In each case, a liquid of one type, and substantially free of liquid of the other type, flows from the permeate outlet of each separator. This arrangement separates contaminants in an aqueous phase entrained in the organic phase from the organic phase, and vice versa.

In terms of method, the invention provides a liquid-liquid extraction process for transferring a component in a first liquid to a second liquid which is substantially immiscible in the first liquid. The process includes the steps of contacting one of the liquids with the other to cause the component to transfer from the first liquid to the second liquid, and forcing the second liquid with the transferred component against a membrane which passes the second liquid with the transferred component and blocks the other liquid so the second liquid with the transferred component is separated from the first liquid.

In the preferred method of the invention, the process includes the step of removing the component from the second liquid to form a regenerated second liquid, and thereafter mixing the regenerated second liquid with a fresh supply of the first liquid containing the component to cause the transfer of additional component to the regenerated second liquid.

BRIEF DESCRIPTION OF THE DRAWINGS

The invention will be more fully understood from the following detailed description and the accompanying drawings in which.

DETAILED DESCRIPTION OF THE INVENTION

Figure 1A:
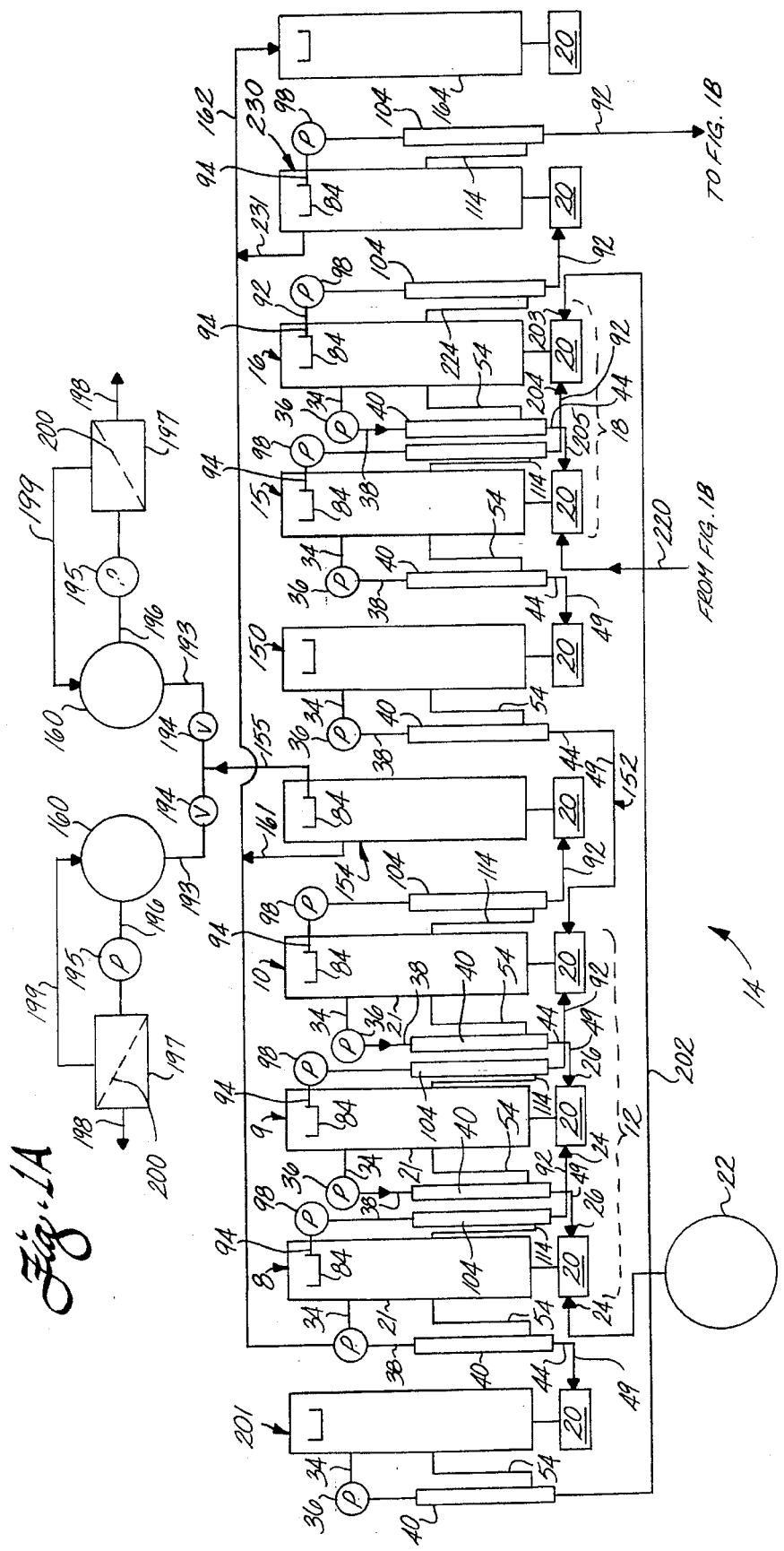
FIGS. 1A and 1B are flow sheets showing liquid-liquid extraction of a spent etching solution using the apparatus and process of this invention.

Referring to FIG. 1A, three identical first, second, and third mixer-settler extractor units 8, 9, and 10, respectively, are connected in series to form an extractor section 12 of a liquid-liquid extraction plant 14, which also includes two identical first and second mixer-settler stripper units 15 and 16, respectively, connected in series form a stripper section 18 for the plant.

The mixer-settlers are of identical construction and preferably are of the type shown in my U.S. Pat. No. 4,595,571, which is incorporated herein by reference. Each mixer-settler unit includes a mixer/pump 20 connected to the lower end of a settler 21. Preferably, the mixer/pump (referred to herein as "mixer" or "pump") is constructed as shown in my abandoned U.S. Pat. application Ser. No. 07/768,461, filed Oct. 2, 1991, and which is incorporated herein by reference.

As shown in FIG. 1A, the extractor and stripper units are connected in series so that liquid to be treated, say, spent ammoniacal etchant solution of ammonium chloride and ionic copper from a tank 22, flows through the plant from left to right (as viewed in FIG. 1A). Organic extracting liquid flows through the extractor and stripper sections from right to left.

Figure 2:
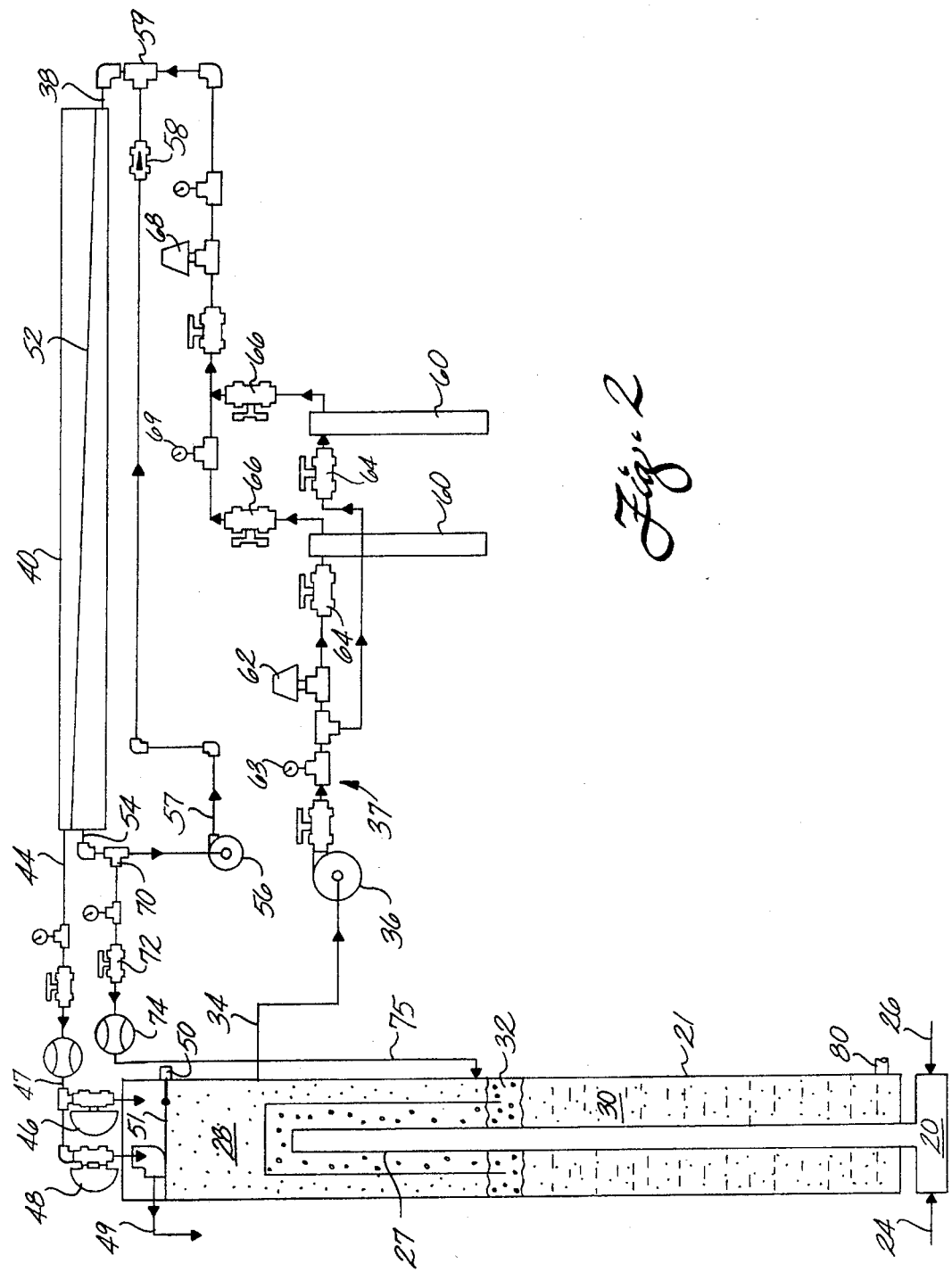
FIG. 2 is a schematic diagram showing how a separator is connected to the organic phase outlet of a mixer-settler used in the process shown in FIGS. 1A and 1B.

The spent etchant solution flows from the spent etchant tank 22 through an aqueous inlet 24 for the mixer 20 of the first extractor unit 8. Organic ion exchange liquid flows into an organic phase liquid inlet 26 of the mixer for the first extractor unit. During contact of the two liquids, ionic copper is transferred from the aqueous phase to the organic phase where the copper is bound by the ion exchange material, which may be of any suitable type well known to those skilled in the art of liquid-liquid extraction. The two liquids are stirred together in the mixer and flow up a riser tube 27 in the settler where they separate, as shown in FIG. 2, to form an upper organic layer 28, a lower aqueous phase 30, and a dispersion phase 32, which is a mixture of the two liquids between the upper and lower layers. Although the mixer-settler combination just referred to provides mixing and settling operations superior to that of prior equipment, a small amount of water droplets remain in the separated organic phase, and a small amount of oil droplets remain in the water phase. For example, the entrained phase may be between about 0.1% and 1.0% by volume of the other phase.

An organic phase outlet 34 supplies organic liquid from an upper portion of the settler to the inlet of an organic phase feed pump 36, the outlet of which is connected to the inlet 38 of an organic phase separator 40 in the shape of a cylindrical tank. As shown in detail only in FIG. 2, a permeate outlet 44 of the separator returns organic liquid to either the upper end of the first settler 21 through a permeate recycle solenoid-operated valve 46 in an organic phase recycle line 47, or through a permeate transfer solenoid-operated valve 48, which passes organic liquid through a transfer line 49 on to another unit, as described in more detail below. A liquid level switch 50 senses the position of the level 51 of the organic liquid in the separator, and controls (through conventional circuitry, not shown) the action of the solenoid-operated valves 46 and 48 to maintain a substantially constant level of organic phase liquid in the settler, as indicated in FIG. 2.

A semi-permeable membrane 52 (FIG. 2) in the separator 40 provides a barrier between the separator inlet 38 and permeate outlet 44. The semi-permeable membrane permits the pregnant organic liquid loaded with copper to pass through it, but is impermeable to any aqueous phase droplets which may be entrained in the organic phase. The separator with the membrane is a proprietary product which may be obtained from Desalination Systems, Inc. of Escondido, Calif. The membrane is a KS8040 Teflon® sheet, which is preferentially wetted by oil (i.e., the sheet is hydrophobic), and has pores through it so small that they do not pass water droplets which may be entrained in the organic phase.

A reject outlet 54 opens from the separator on the same side of the membrane barrier 52 as the separator inlet, but is spaced a substantial distance from the inlet so that liquid flowing into the separator must travel relatively far and in contact with a large area of the semi-permeable membrane before leaving the separator through the reject outlet 54, which is connected to the inlet of a recirculation pump 56 having an outlet 58 connected through a check valve 58 and a T-joint 59 to the inlet 38 of the separator.

A pair of filters 60 are connected in parallel in the organic feed supply line 37, and each contain filter elements which remove any particles having a size larger than about 1 micron. This minimizes plugging of the semi-permeable membrane. A high-pressure cutoff switch 62 in the organic feed supply line on the upstream side of the filters detects any abnormal rise in pressure resulting from plugging of the filters, and shuts down the operation of the plant until the situation can be remedied. A first pressure gauge 63 in the line 37 upstream from the filters indicates pressure in that part of the line. Preferably, each filter is connected to supply line 37 through a respective upstream isolation valve 64 and a respective downstream isolation valve 66, which permits either of the filters to be isolated from supply line 37, so the filters can be used simultaneously, or alternately to permit one filter to be serviced while the other supplies organic liquid to the separator inlet. A low-pressure cutoff switch 68 in the supply line on the downstream of the filters detects any abnormal drop in pressure, such as might occur with clogging of the filters, a rupture of the semi-permeable membrane or the enclosing tank 40, and shuts down the operation of the plant until any such trouble can be remedied. A second pressure gauge 69 in line 37 downstream from the filters indicates pressure in that part of the line.

For proper operation, the separator should always remain full of liquid on both sides of the semi-permeable membrane. To this end, the feed pump 36 supplies liquid to the separator at a rate equal to about twice that which passes through the membrane. For example, the feed pump may supply about 20 gallons of organic liquid per minute through the separator, 10 gallons of which flows through the membrane, out the permeate outlet, and back to the settler for distribution by the permeate recycle and transfer valves 46, 48, as described above. The other 10 gallons flows out the reject outlet.

The high-pressure side of the semi-permeable membrane is swept free of material, such as aqueous phase droplets entrained in the organic phase, which would tend to plug the membrane, by the recirculation pump 56, which recirculates liquid past the high-pressure side of the membrane from the separator inlet 38 to the reject outlet 54 at a rate about equal to that supplied by the feed pump 36. For example, the recirculation pump forces about 20 gallons per minute through the separator on the high-pressure side of the membrane. About half this volume, or about 10 gallons per minute, flows through a T-joint 70, a concentrate throttle valve 72, a flow meter 74, and a reject return line 75 to an intermediate level of the settler just above the dispersion phase 32. The remainder (about 10 gallons per minute) returns (with the 10 gallons of organic phase which did not pass through the membrane) to the inlet of the recirculation pump 56. As an example of equilibrium conditions when the organic phase supplied from the settler to the feed pump inlet has between about 0.1% and about 1.0% water (by volume) entrained in the organic phase, the organic liquid flowing from the separator permeate outlet is substantially free of entrained water, while the organic liquid in the separator on the high-pressure side of the semi-permeable member contains between about 1% and about 10% by weight of water. This liquid, with the concentrated amount of unwanted water phase in the organic phase, returns to the settler for separation by gravity. The entrained water contains ammonium chloride, which is a contaminant that is removed from the organic phase by this invention.

To summarize, the feed pump and recirculation pump each supply about 20 gallons per minute (for a total of 40 gallons) to the separator inlet. Ten gallons per minute of purified organic liquid loaded with copper flow through the semi-permeable membrane and back to the upper end of the settler for distribution by the permeate recycle and transfer valves, as described below. Thirty gallons per minute flow out the separator reject outlet, 10 gallons of which (with the increased concentration of entrained water) return to the settler. The remaining 20 gallons recirculate through the high-pressure side of the separator to sweep water droplets from that side of the membrane.

Figure 3:
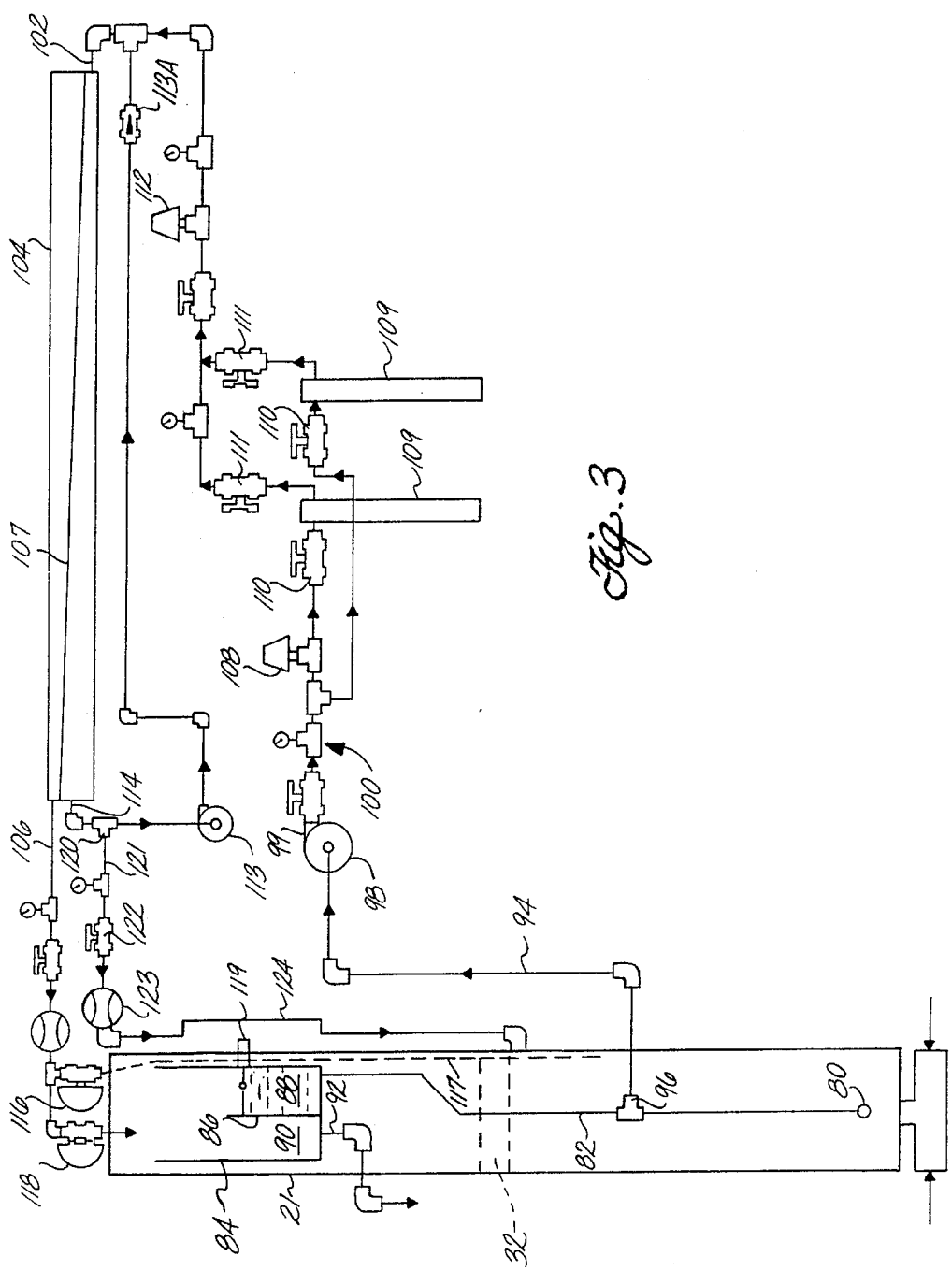
FIG. 3 is a schematic diagram showing how a separator is connected to the aqueous phase outlet of a mixer-settler used in the process shown in FIGS. 1A and 1B.

Referring to FIG. 3, the water phase separated from the liquids in the first extractor unit flows from the bottom of the settler 21 through an aqueous phase outlet 80 and up an exterior standpipe 82 into the bottom of an open bucket 84 mounted on the exterior of the upper end of the settler. An upright baffle 86, sealed along its sides and lower edge to the interior bottom surface of the bucket, divides the bucket into a recirculation compartment 88 and a feed compartment 90 from which aqueous phase liquid flows through an aqueous feed line 92 to the second extractor unit 9, as described in more detail below. An aqueous phase supply line 94 is connected at one end to a T-joint 96 in standpipe 82 and at the other end to the inlet of an aqueous phase feed pump 98 having a discharge 99 connected to a supply line 100, which is connected to the inlet 102 of an aqueous phase separator 104 having a permeate outlet 106. A semi-permeable membrane 107 in the aqueous phase separator 104 forms a barrier between the inlet 102 and the outlet 106. The aqueous phase separator 104 is of substantially the same construction as the organic phase separator 40, described above with respect to FIG. 2, except that the membrane 107 is pretreated with an aqueous solution of alcohol to make the membrane preferentially water-wettable so the membrane passes water, but does not pass fine droplets of organic phase liquid which may be entrained in the water phase entering the separator.

As with the plumbing described above with respect to FIG. 2 for the organic phase separator, the aqueous supply line 100 shown in FIG. 3 includes a high-pressure cutoff switch 108, a pair of 1-micron filters 109 connected in parallel, upstream and downstream isolation valves 110, 111, respectively, and a low-pressure cutoff switch 112. A recirculation pump 113 picks up liquid from a reject outlet 114 opening from the separator on the same side of the semi-permeable membrane as the inlet 102, and pumps liquid through a check valve 113A back to the inlet 102. Aqueous phase liquid (free of entrained organic phase, which carries copper) flows from the separator permeate outlet through either a permeate recycle valve solenoid-operated valve 116 through an aqueous return line 117 to the extractor 21 below the dispersion layer 32, or through a permeate feed solenoid-operated valve 118 to feed compartment 90 of bucket 84. An aqueous liquid level switch 119 senses the water level in the recycle compartment and operates the valves 116 and 118 (through conventional circuity, not shown) to keep the water level substantially constant in the recycle compartment. Some of the liquid flowing from the separator reject outlet passes through a T-joint 120, a return line 121, an organic phase concentrate throttle valve 122, a flow meter 123, a downcomer line 124, and back into the settler just below the dispersion layer 32 where water and entrained organic phases separate.

As an example of operation of the flow system shown in FIG. 3, the aqueous phase feed pump 98 pumps about 20 gallons per minute of aqueous phase with entrained organic phase droplets to the separator inlet. The aqueous phase may contain between about 0.1% and about 1.0% entrained organic phase, which carries copper. About 10 gallons per minute of aqueous phase flows through the semi-permeable membrane free of entrained organic phase, which is concentrated (to between about 1.0% and about 10% percent organic phase by volume) in the separator on the high-pressure side of the membrane. The other 10 gallons flows from the reject outlet through T-joint 120 to the recirculation pump inlet.

The recirculation pump 113 circulates about 20 gallons per minute of liquid through the separator on the high-pressure side of the membrane. About 10 gallons per minute of the concentrate flowing from the separator reject outlet flows back into the settler. The remaining 10 gallons of concentrate return to the inlet of the recirculation pump to join the 10 gallons of aqueous phase which did not pass through the membrane and recirculate through the separator to sweep the high-pressure side of the membrane to prevent minute oil droplets from accumulating and plugging the high-pressure side of the membrane.

The aqueous discharge through feed line 92 from the bucket of the first extractor unit 8 still contains some dissolved copper and therefore is fed into the inlet 24 of the mixer 20 for the second extractor unit 9, where it is stirred with organic ion exchange liquid flowing from the third extractor unit 10 into the mixer through inlet 26. The aqueous and organic phases are stirred together, as previously described for the first extractor unit, and pumped up into the settler 21 of the second extractor unit, where the aqueous and organic phases separate, and each flow out their respective outlets and through respective organic and aqueous separators 40 and 104, respectively. Virtually all of the copper ions are extracted from the aqueous phase in the second extractor unit, but to be sure, the aqueous effluent from the extraction stage 2 is stirred with additional organic liquid ion exchange phase in mixer 20 of the third extractor unit 10 and passed up into the settler 21 for that unit where the aqueous and organic phases separate and flow out through their respective separators, as shown in FIG. 1A.

The organic phase entering the mixer of the third extractor unit is fresh from the stripper section, and therefore has maximum capacity for removing residual traces of any copper ions which may remain in the aqueous flow of the third extractor unit. The fresh organic liquid flows from a buffer column 150 after passing through a respective organic separator 40 and a supply line 152.

To summarize the flow of organic liquid through the first, second, and third extractor units, fresh organic extractant liquid enters mixer 20 of the third extractor unit and is stirred with aqueous phase (virtually free of dissolved copper) entering the same mixer from the second extractor unit. The aqueous and organic phases flow up into the settler where the two phases separate into the organic and aqueous phases for further flow through their respective aqueous and organic phase separators, as previously described. The organic phase from the organic feed line for the third extractor unit then flows through the second extractor unit where it encounters aqueous phase (with dissolved copper not removed in the first extractor unit) coming from the first extractor unit. Organic phase liquid from the second extractor unit flows into the mixer of the first extractor where it is contacted with incoming spent etchant solution, which has a relatively high concentration of ionic copper.

The aqueous phase from the third extractor unit 10 passes through a respective aqueous separator 104, as described above with respect to FIG. 3, and then flows through a respective pump 20, and up into a coalescer 154, which ensures final separation of any organic phase which may remain with the aqueous phase, which is then passed through a raffinate line 155 to raffinate storage tanks 160. Any organic phase separated in the coalescer is collected and sent through a transfer line 161 to a return line 162 to a storage tank 164 for organic liquid.

Figure 4:
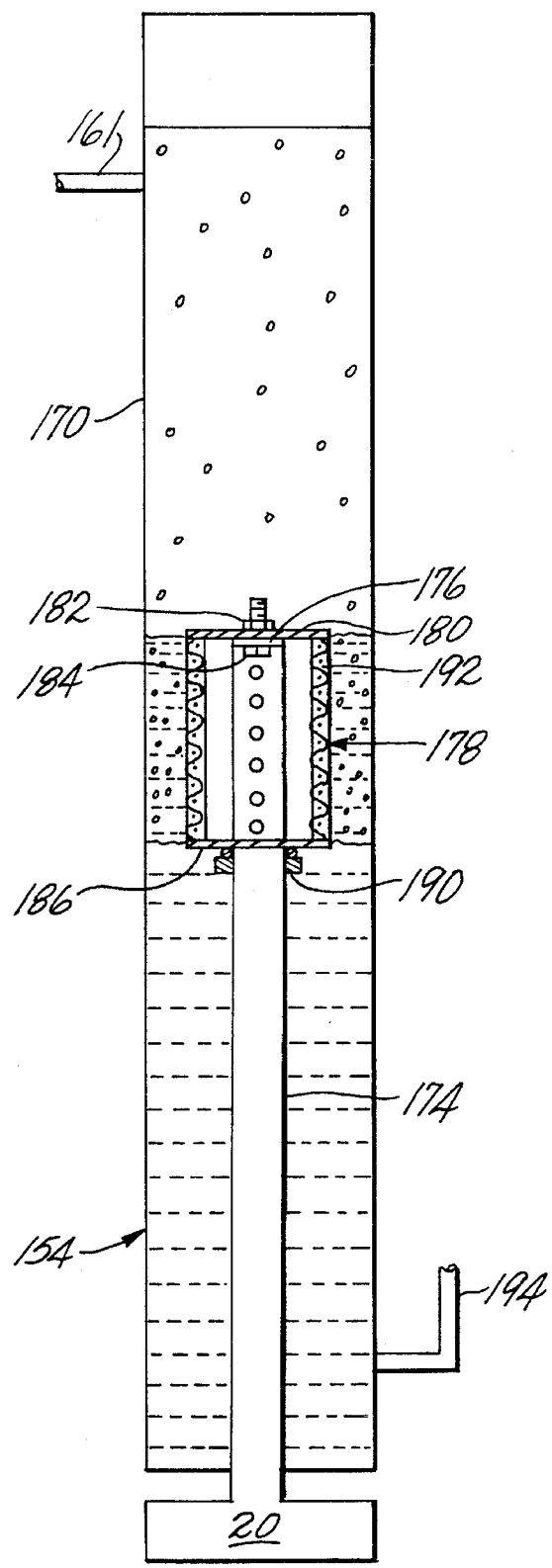
FIG. 4 is a schematic cross-sectional elevation of a coalescer used in the apparatus shown in FIGS. 1A and 1B.

As shown schematically in FIG. 4, the coalescer 154 includes an upright cylindrical housing 170. The pump 20 at the bottom of the coalescer pumps incoming aqueous liquid (and any traces of organic liquid which may be present) up through a vertical riser pipe 174 perforated adjacent its upper end, which is closed by a plate 176. A cylindrical spool 178, closed at its upper end by a circular plate 180, is secured by a titanium nut 182 and bolt 184 to the plate at the upper end of the riser pipe so the spool is concentrically disposed around and spaced from that pipe. The lower end of the spool is closed by a horizontal annular plate 186, which makes a snug fit around the riser pipe and is sealed to the pipe by an O-ring 188 resting on a collar 190 secured to the riser pipe. The spool has an annular wall 192 made of polypropylene mesh with about ¼" openings. Fiberglass thread is wound around the polypropylene mesh to retain any particle or droplet which is larger than about 0.5 micron. Thus, aqueous phase liquid entering the coalescer flows outwardly through the coalescer spool, which forces entrained organic phase droplets to coalesce so that the organic phase separates and rises to the top of the coalescer and flows into transfer line 161. The aqueous phase liquid flows out the raffinate discharge line 155 to the raffinate storage tanks 160. The aqueous phase in raffinate storage is free of organic phase liquid and dissolved copper, and contains only ammonium chloride and some ammonium hydroxide. The raffinate storage is regenerated by the introduction of anhydrous ammonia to produce the desired pH so that the raffinate is regenerated into fresh etching solution, which may be reused.

As a precaution against unexpected contamination of the raffinate stored in the tanks 160, each tank is connected through a respective receiving line 193 and a respective control valve 194 to the raffinate discharge line 155.

The bottom of each tank is also connected through an outlet line 196 to the inlet of a respective pump 195. The outlet of each pump 195 is connected to a respective inlet 196 of a respective separator 197. Each separator has a permeate outlet 198 and a reject outlet 199, which returns reject liquid to the top of its respective tank. Each separator includes a semi-permeable membrane 200, which passes water with dissolved ammonium chloride and ammonium hydroxide, but is impermeable to di- and tri- valent ions, such as ammonium sulfate ions, and other ions larger than ammonium chloride, such as copper ammonium chloride. Thus, liquid flowing from the permeate outlet 198 of separator 197 contains only ammonium chloride, and perhaps some ammonium hydroxide (depending on the condition of the spent etchant solution being treated). The semi-permeable membrane 200 is a proprietary product which may be obtained from Desalination Systems Inc. of Escondido, Calif. The membrane 200 is a DK4040CJ polysulfone sheet, which passes relatively small ions, such as ammonium, chloride, and hydroxyl ions, but will not pass larger ions, such as copper ammonium chloride. After the contaminants in the raffinate have been concentrated by a factor about 10 or 20, the raffinate is discarded.

By using the semi-permeable membranes connected to the outlets of the extractors and strippers as described above, the raffinate would contain little or no contaminants so that 98 to 100 percent of the raffinate in each tank could be recovered from the permeate outlet of each separator. However, if the separators were not used on the extractors and strippers as described above, the concentration of ammonium sulfate (and perhaps other contaminants) would be so large that only about 80% of the liquid in each tank could be recovered through the permeate outlet free of ammonium sulfate before the concentration of the contaminant in the recycled solution rose so high that it had to be discarded. Thus, although the separators connected to the outlet of the raffinate tanks would permit the separators connected to the outlets of the extractors and strippers, as shown in FIG. 1A, to be omitted, much less raffinate could be recovered for regeneration, and there would be a substantial waste disposal problem, which is eliminated by the use of the separators connected to the outlets of the extractors and strippers.

Returning to the flow of the liquids through the extractor and stripper sections, the organic phase from the first extractor unit is loaded with extracted copper and, after passing through the organic phase separator 40 associated with the first extractor unit, flows through a respective feed line 49 and pump 20 at the lower end of a buffer column 201. Buffer columns 150 and 201 and the respective pumps 20 at their lower ends are built substantially as described previously for the mixer-settler units for the extractor and stripper units. The buffer columns are filled with sufficient water in their lower portions to provide the required hydraulic balance for flow of liquid through the plant. Organic liquid is taken from the buffer column 201 by a respective organic feed pump 36 and circulated through a respective organic phase separator 40, which is arranged as described above with respect to flow of organic phase liquid from the extractors. The organic phase liquid with the dissolved copper flows from the buffer separator 40, through an organic phase supply line 202, to an organic phase inlet 203 of a mixer 20 at the bottom of the second stripper unit 16, in the stripper section 18. A stripping liquid, which is a relatively strong sulfuric acid aqueous solution, flows through an aqueous inlet 204 for the mixer 20 at the lower end of the second stripper unit. The stripping liquid comes from a respective feed line 92 at the aqueous discharge side of the first stripper unit 15 after passing through a respective aqueous separator 104 connected to the settler 21 for the first stripper unit, just as described above with respect to FIG. 3.

Figure 1B:
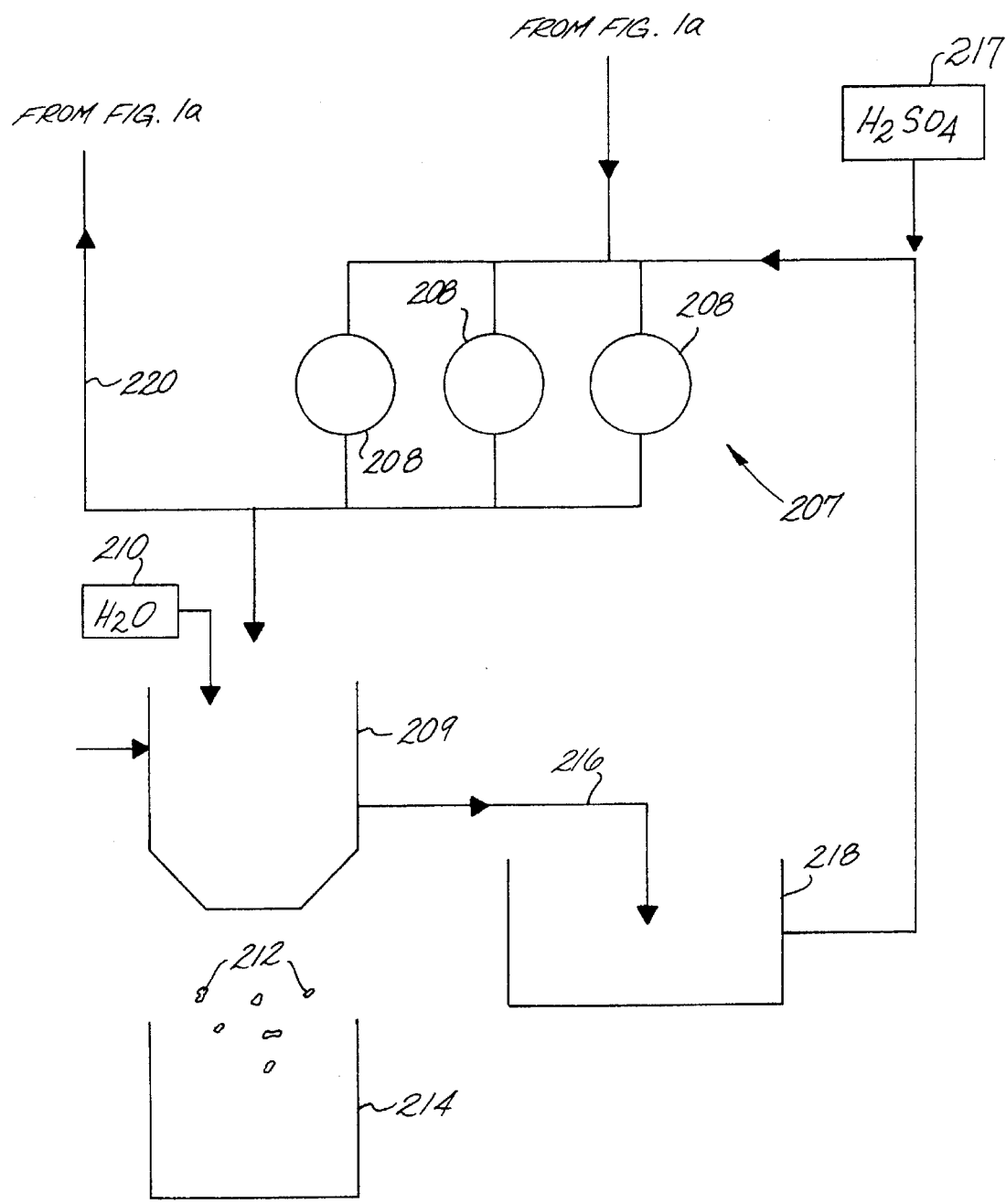

Organic phase liquid from the second stripper unit flows through a respective organic feed pump 36, a respective organic phase separator 40, and through an inlet 205 into a mixer 20 at the bottom of the settler 21 for the first stripper unit. Fresh stripping liquid flows into an inlet 206 for the mixer connected to the bottom of the settler 21 of the first stripper unit 15. The fresh stripping liquid comes from a crystallizer section 207 (FIG. 1B) which removes copper from the stripping solution, as described in more detail below.

Incoming fresh aqueous sulfuric acid stripper solution is mixed in the first stripper unit with organic phase liquid from which most of the copper has been removed in stripper stage two. Organic phase liquid (free of copper) flows from the organic phase outlet of the first stripper unit, through organic phase feed pump 36, an organic phase separator 40, and into a respective pump 20 at the lower end of the buffer column 150 previously described. Thus, organic phase liquid leaving the first stripper unit is virtually free of all copper before entering the buffer column 150 from which it is supplied as fresh organic extractant liquid to the bottom of the third extractor unit, as described above and as shown in FIG. 1A.

Aqueous phase stripper liquid loaded with copper removed from the organic phase liquid leaves the aqueous phase feed line 91 of the second stripper unit and flows through a respective aqueous feed pump 98, a respective aqueous separator 104, and into a respective pump 20 at the bottom of a stripper coalescer 230, which is constructed identically with that described above for coalescer 154 for the aqueous phase from the extraction section. Any organic phase liquid recovered in the stripper coalescer is sent through a transfer line 231 to return line 162 for organic liquid storage.

Each organic or aqueous phase outlet from each buffer, extractor unit, coalescer, or stripper unit which delivers liquid to a respective separator is connected to that separator, as described above with respect to FIGS. 2 and 3. The details of those identical connections are not repeated herein for brevity, and are not fully shown in FIG. 1A for simplicity. Moreover, the hydraulic head of the organic phase liquid is the same in each buffer, extractor and stripper units, and coalescers. The same is true for the aqueous phase, so that liquid flows through the plant at a rate equal to that at which spent etchant is introduced into the first extractor unit.

Aqueous phase stripper liquid loaded with copper flows from the aqueous feed line 94 of the stripper coalescer 230, through an aqueous separator 104, and to three conventional crystallizers 208 connected in parallel so that they can be used simultaneously or alternatively while one or two of them is serviced. The temperature of the aqueous stripper liquid loaded with copper ions is about 140° F. The crystallizers cool the incoming liquid sufficiently (say, to about 40° F.) to crystallize a substantial amount of copper sulfate from the sulfuric acid stripper aqueous phase to form a slurry of sulfuric acid and copper sulfate crystals, which are separated in a centrifuge 209 where they are washed with water from a source 210. The copper sulfate crystals 212 are collected in a storage bin 214, and sulfuric acid is returned through a line 216 to a surge tank 208 for recirculation through the crystallizers. Makeup sulfuric acid aqueous solution from a source 217 is supplied to the crystallizers.

Some of the sulfuric acid stripper liquid flowing from the crystallizers 208 is recirculated through stripper liquid return line 220 to the inlet 206 of mixer 20 in the first stripper unit 15. Thus, aqueous stripper solution flows from left to right (as viewed in FIG. 1A) in the stripper section, while the organic phase liquid flows through the stripper section from right to left.

With the invention just described, spent solution can be processed at a high rate, and with little or no cross-contamination, because of the respective separators connected to the aqueous and organic liquid outlets of the extractors, strippers, buffers, and coalescers.

Spent etchant aqueous phase entrained in the organic phase liquid of the extraction section is separated from the organic phase loaded with extracted copper before that organic phase enters the stripper section, where unremoved water droplets with ammonium chloride could contaminate the stripper solution and the copper removed from the stripper solution. Conversely, sulfate ions in the stripper liquid which might be entrained in the organic phase in the stripper section are removed before the organic phase returns to the extraction section where any unremoved water droplets with sulfate ions would tend to contaminate the raffinate. Thus, chloride ions are prevented from entering the aqueous phase of the stripper section, and sulfate ions are prevented from entering the aqueous phase of the extraction section. This results in superior product and a higher throughput for the extraction plant. In effect, each separator provides the function previously provided by large and expensive settlers operating at relatively low throughput.

Moreover, organic liquid is prevented from being carried over into the raffinate where it would contaminate that product and interfere with its etching properties. Organic liquid is also prevented from being carried into the crystallizer section where it would interfere with the crystallization and the purity of the copper sulfate.

In addition to copper, other materials, such as uranium, plutonium, cobalt, molybdenum, nickel, gold, radioactive iodine, and the like, can be recovered in accordance with this invention by using appropriate well-known ion exchange materials and stripper solutions.

I claim:

1. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

mixing the second liquid to which copper ions have been transferred with a stripper liquid which contains sulfate ions and which contacts the second liquid to transfer copper ions from the second liquid to the stripper liquid to form a regenerated second liquid;

collecting as raffinate first liquid from which copper ions have been removed;

and flowing collected raffinate through a membrane permeable to water and ammonium, chloride and hydroxyl ions and substantially impermeable to sulfate ions so an aqueous solution of ammonium chloride flows through the membrane substantially free of sulfate ions.

2. A method according to claim 1 which includes removing copper from the stripper liquid to form regenerated stripper liquid, mixing regenerated second liquid with additional first liquid to transfer additional copper ions to the regenerated second liquid, mixing the regenerated second liquid and the additional copper ions with the regenerated stripper liquid to transfer the additional copper ions from the regenerated second liquid to the regenerated stripper liquid, collecting as additional raffinate at least some of the additional first liquid from which the additional copper ions have been removed, the flowing additional raffinate through the membrane.

3. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

mixing the second liquid to which copper ions have been transferred with a stripper liquid which contains sulfate ions and which contacts the second liquid in the stripper to transfer copper ions from the second liquid to the stripper liquid to form a regenerated second liquid;

flowing first liquid from which copper ions have been removed through a membrane permeable to water and ammonium and chloride ions and substantially impermeable to the second liquid; and collecting as raffinate first liquid from which copper ions have been removed and which has passed through the membrane.

4. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

flowing second liquid to which copper ions have been transferred through a membrane permeable to the second liquid and copper ions and substantially impermeable to water;

thereafter mixing the second liquid to which copper ions have been transferred with a stripper liquid which contains sulfate ions and which contacts the second liquid in the stripper to transfer copper ions from the second liquid to the stripper liquid to form a regenerated second liquid; and collecting as raffinate first liquid from which copper ions have been removed.

5. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

mixing the second liquid to which copper ions have been transferred with a stripper liquid which contains sulfate ions and which contacts the second liquid in the stripper to transfer copper ions from the second liquid to the stripper liquid to form a regenerated second liquid;

flowing stripper liquid to which copper ions have been transferred from the second liquid through a membrane permeable to the stripper liquid and substantially impermeable to the second liquid; and collecting as raffinate first liquid from which copper ions have been removed.

6. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

mixing the second liquid to which copper ions have been transferred with a stripper liquid which contains sulfate ions and which contacts the second liquid in the stripper to transfer copper ions from the second liquid to the stripper liquid to form a regenerated second liquid;

flowing second liquid after copper ions have been removed by contact with stripper liquid through a membrane which is permeable to the second liquid and substantially impermeable to the stripper liquid; and collecting as raffinate first liquid from which copper ions have been removed.

7. A method according to claim 3, 4, 5 or 6 which includes the step of flowing collected raffinate through a membrane permeable to water and ammonium, chloride and hydroxyl ions and substantially impermeable to sulfate ions so an aqueous solution of ammonium chloride flows through the membrane substantially free of sulfate ions.

8. A liquid-liquid extraction process for transferring copper ions in an aqueous ammoniacal solution of ammonium chloride (first liquid) to an organic liquid (second liquid) which contains an ion exchange material for copper ions and is substantially immiscible in the first liquid, the process comprising the steps of:

mixing the first and second liquids in an extractor unit to transfer copper ions from the first to the second liquid;

flowing second liquid to which copper ions have been transferred through a first membrane permeable to the second liquid and copper ions and substantially impermeable to water;

thereafter mixing the second liquid to which copper ions have been transferred with a stripper liquid which contains sulfate ions and which contacts the second liquid to transfer copper ions from the second liquid to the stripper liquid to form a regenerated second liquid;

flowing second liquid after copper ions have been removed by contact with stripper liquid through a second membrane permeable to the second liquid and substantially impermeable to the stripper liquid;

flowing stripper liquid to which copper ions have been transferred from the second liquid through a third membrane permeable to the stripper liquid and substantially impermeable to the second liquid;

flowing first liquid from which copper ions have been removed through a fourth membrane permeable to water and ammonium and chloride ions and substantially impermeable to the second liquid;

collecting as raffinate first liquid which has passed through the fourth membrane from which copper ions have been removed;

and flowing collected raffinate through a fifth membrane permeable to water and ammonium, chloride and hydroxyl ions, and substantially impermeable to sulfate ions so an aqueous solution of ammonium chloride flows through the membrane substantially free of sulfate ions.

* * * * *